US008575780B2

(12) United States Patent
Moon (10) Patent No.: US 8,575,780 B2
(45) Date of Patent: Nov. 5, 2013

(54) POWER STORAGE APPARATUS, METHOD OF OPERATING THE SAME, AND POWER STORAGE SYSTEM

(75) Inventor: Chong-Sop Moon, Yongin-si (KR)

(73) Assignee: Samsung SDI, Co., Ltd., Yongin-si, Gyeonggi-do (KR)

( * ) Notice: Subject to any disclaimer, the term of this patent is extended or adjusted under 35 U.S.C. 154(b) by 478 days.

(21) Appl. No.: 12/953,301

(22) Filed: Nov. 23, 2010

(65) Prior Publication Data

US 2011/0175451 A1    Jul. 21, 2011

(30) Foreign Application Priority Data

Jan. 18, 2010    (KR) .................. 10-2010-0004476

(51) Int. Cl.
*H02J 7/02* (2006.01)
*H02J 7/32* (2006.01)
*H02J 7/34* (2006.01)

(52) U.S. Cl.
USPC ............................... 307/66; 307/64; 307/125

(58) Field of Classification Search
USPC ............................. 307/64, 66, 125
See application file for complete search history.

(56) References Cited

U.S. PATENT DOCUMENTS

| | | | | |
|---|---|---|---|---|
| 6,487,096 B1 * | 11/2002 | Gilbreth et al. | ................ | 363/35 |
| 6,949,843 B2 * | 9/2005 | Dubovsky | ................ | 307/64 |
| 7,117,044 B2 * | 10/2006 | Kocher et al. | ................ | 700/34 |
| 7,227,278 B2 * | 6/2007 | Realmuto et al. | ................ | 307/44 |
| 7,330,016 B2 * | 2/2008 | Colley | ................ | 322/47 |
| 7,489,106 B1 * | 2/2009 | Tikhonov | ................ | 320/116 |
| 7,733,670 B2 * | 6/2010 | Feng et al. | ................ | 363/17 |
| 7,786,616 B2 * | 8/2010 | Naden et al. | ................ | 307/64 |
| 7,839,019 B2 * | 11/2010 | Chang et al. | ................ | 307/64 |
| 7,880,334 B2 * | 2/2011 | Evans et al. | ................ | 307/66 |
| 8,008,808 B2 * | 8/2011 | Seeker et al. | ................ | 307/72 |
| 8,049,366 B2 * | 11/2011 | Shyu et al. | ................ | 307/66 |
| 8,410,634 B2 * | 4/2013 | Park | ................ | 307/65 |
| 8,456,878 B2 * | 6/2013 | Min | ................ | 363/95 |
| 2004/0207366 A1 * | 10/2004 | Sung | ................ | 320/140 |
| 2005/0121979 A1 | 6/2005 | Matsumoto et al. | | |
| 2006/0158037 A1 * | 7/2006 | Danley et al. | ................ | 307/64 |
| 2007/0029799 A1 | 2/2007 | Shimizu et al. | | |
| 2009/0086520 A1 * | 4/2009 | Nishimura | ................ | 363/133 |

(Continued)

FOREIGN PATENT DOCUMENTS

JP    8-223816 A    8/1996
JP    3015024 B1    12/1999

(Continued)

OTHER PUBLICATIONS

Bangyin Liu, et al, "Design Considerations and Topology Selection for DC-Module-Based Building Integrated Photovoltaic System", Jun. 3, 2008, IEEE, 3rd IEEE Conference on Industrial Electronics and Applications, pp. 1066-1070.*

(Continued)

*Primary Examiner* — Adi Amrany
(74) *Attorney, Agent, or Firm* — Knobbe, Martens, Olson & Bear LLP (57) ABSTRACT

A power storage system and method are disclosed. The system is connected to a load, a power grid, and a power generation system. When the grid is in an abnormal state, a battery is simultaneously charged with power from the power generation system and used to supply power to the load.

14 Claims, 6 Drawing Sheets

(56) References Cited

U.S. PATENT DOCUMENTS

| | | |
|---|---|---|
| 2009/0236916 A1 | 9/2009 | Nishimura |
| 2011/0095606 A1* | 4/2011 | Ou .................................. 307/26 |
| 2011/0115295 A1* | 5/2011 | Moon et al. ..................... 307/65 |
| 2011/0133556 A1* | 6/2011 | Choi ............................... 307/65 |
| 2011/0133558 A1* | 6/2011 | Park ............................... 307/66 |
| 2011/0144822 A1* | 6/2011 | Choi ............................. 700/297 |
| 2011/0148205 A1* | 6/2011 | Moon ............................. 307/65 |
| 2011/0208370 A1* | 8/2011 | Lee .............................. 700/297 |
| 2011/0210614 A1* | 9/2011 | Min ................................ 307/82 |
| 2011/0215649 A1* | 9/2011 | Min et al. ........................ 307/72 |
| 2011/0216562 A1* | 9/2011 | Gengenbach .................. 363/71 |
| 2011/0291479 A1* | 12/2011 | Lee ................................ 307/43 |
| 2012/0043819 A1* | 2/2012 | Kang et al. ..................... 307/80 |
| 2012/0068545 A1* | 3/2012 | Shim ............................... 307/80 |
| 2013/0069429 A1* | 3/2013 | Yang et al. ..................... 307/23 |
| 2013/0127626 A1* | 5/2013 | Yoo ......................... 340/636.19 |

FOREIGN PATENT DOCUMENTS

| | | |
|---|---|---|
| JP | 2001-268800 A | 9/2001 |
| JP | 2004-180467 A | 6/2004 |
| JP | 2005-176461 | 6/2005 |
| JP | 2008-54473 | 3/2008 |
| JP | 2008-99527 | 4/2008 |
| JP | 2008-228543 | 9/2008 |
| JP | 2009-247108 | 10/2009 |
| KR | 10-2006-0085239 A | 7/2006 |
| WO | WO 2010130273 A1 * | 11/2010 |

OTHER PUBLICATIONS

Huan Yang, et al. "A Power Conditioning System for a Hybrid Energy System with Photovoltaic and Sodium-Sulfur Battery", Oct. 1, 2007, IEEE, International Conference on Electrical Machines and Systems, pp. 244-247.*

* cited by examiner

POWER STORAGE APPARATUS, METHOD OF OPERATING THE SAME, AND POWER STORAGE SYSTEM

CROSS-REFERENCE TO RELATED APPLICATIONS

This application claims the benefit of Korean Patent Application No. 10-2010-0004476, filed on Jan. 18, 2010, in the Korean Intellectual Property Office, the disclosure of which is incorporated herein in its entirety by reference.

BACKGROUND

1. Field

The disclosed technology relates to a power storage apparatus for supplying power to loads in association with a power grid generation system, a method of operating the power storage apparatus, and a power storage system.

2. Description of the Related Technology

Power storage systems are associated with a grid or are independent power storage systems that are not associated with grids. Grid associated power storage systems are connected to power grids. In more detail, power generation systems generate power, which is transmitted to one or more grids, and, if power generation systems do not generate a sufficient amount of power, an insufficient amount of power is supplied from the grids. Independent power storage systems store power generated in power generation systems and use the stored power if needed. It is necessary to develop various power storage systems.

Electric power generators, such as power companies, produce power from various resources which have varying degrees of reliability. For instance, renewable energy resources are naturally replenished but flow-limited. They are virtually inexhaustible in duration but limited in the amount of energy that is available per unit time.

Furthermore, to supply electric power to consumers, the power generators must distribute their energy to a power grid. An electric power grid is a system of synchronized power providers and consumers connected by transmission and distribution lines and operated by one or more control centers. Thus, the reliability of adequate power for distribution depends on both the availability generated and the proper flow through the grid.

A breakdown in either power provider or grid can cause a complete or partial power outage. In addition, there may be a transition period, sometimes called a quasi-normal state, that occurs between such abnormal and normal states of power distribution. In these instances of disruption, a battery back up for the load i.e. a device that uses electric power, on the consumer side may be used to maintain effective reliability to the electric power user.

SUMMARY OF CERTAIN INVENTIVE ASPECTS

One aspect is a power storage apparatus, including a power conversion unit connected between a power generation system and a first node, where the power conversion unit is configured to convert power generated by the power generation system into a DC voltage for the first node. The apparatus also includes a battery management system (BMS), and a bi-directional converter connected between the BMS and the first node, where the bi-directional converter is configured to convert the DC voltage of the first node to a DC voltage for the BMS and to convert the DC voltage of the BMS to the DC voltage of the first node. The apparatus also includes a bi-directional inverter connected between the first node and a second node, where the bi-directional inverter is configured to invert the DC voltage of the first node into an AC voltage for a load or for a power grid and to convert an AC voltage from the power grid into the DC voltage of the first node. The apparatus also includes a grid connector for connecting the power grid to the second node, and a battery configured to be charged by power from the power generation system and from the grid, and to be discharged to supply power to the load. The apparatus also includes an integrated controller configured to determine a state of the grid, and if the grid is in an abnormal state to control the grid connector to disconnect the power grid from the second node, and the integrated controller is configured to control the power conversion unit, the bi-directional converter, the bi-directional inverter, the grid connector, and the battery, where if the grid is in an abnormal state the integrated controller monitors a charging and discharging status of the battery and controls the battery to supply power to the load and to be simultaneously charged with power generated by the power generation system.

Another aspect is a method of operating a power storage apparatus connected to a power generation system, a power grid, and to a load. The apparatus includes a power conversion unit, a bi-directional converter, a bi-directional inverter, a grid connector, a battery including a plurality of battery units, and an integrated controller for controlling the power conversion unit, the bi-directional converter, the bi-directional inverter, the grid connector, and the battery. The method includes disconnecting the power grid from the power storage apparatus as a result of the grid being in an abnormal state, monitoring a charging and discharging status of each of the plurality of battery units, and according to the charging and discharging status of each of the plurality of battery units discharging certain battery units to supply power to the load, and simultaneously charging other battery units with power generated by the power generation system.

Another aspect is a power storage system connected to a power generation system, a power grid, and to a load. The apparatus includes a battery having a plurality of battery units, where the battery units are configured to be individually charged and discharged, and a plurality of switching elements, each switching element configured to connect one of the battery units to a charging path or to a discharging path. The apparatus also includes an integrated controller configured to determine a state of the grid, and if the grid is in an abnormal state to monitor the charging and discharging status of each of the battery units, and to control the switching elements of the battery such that battery units which are in a completely charged state are connected to the discharging path and that battery units in an incomplete charging state are connected to the charging path.

BRIEF DESCRIPTION OF THE DRAWINGS

These and/or other aspects will become apparent and more readily appreciated from the following description of certain embodiments, taken in conjunction with the accompanying drawings of which.

DETAILED DESCRIPTION OF CERTAIN INVENTIVE EMBODIMENTS

Reference will now be made in detail to embodiments, examples of which are illustrated in the accompanying drawings, wherein like reference numerals generally refer to like elements throughout. Embodiments may have different forms and should not be construed as being limited to the descriptions set forth herein. Accordingly, the embodiments are described below, with reference to the figures, to explain various inventive aspects of the present description.

Figure 1:
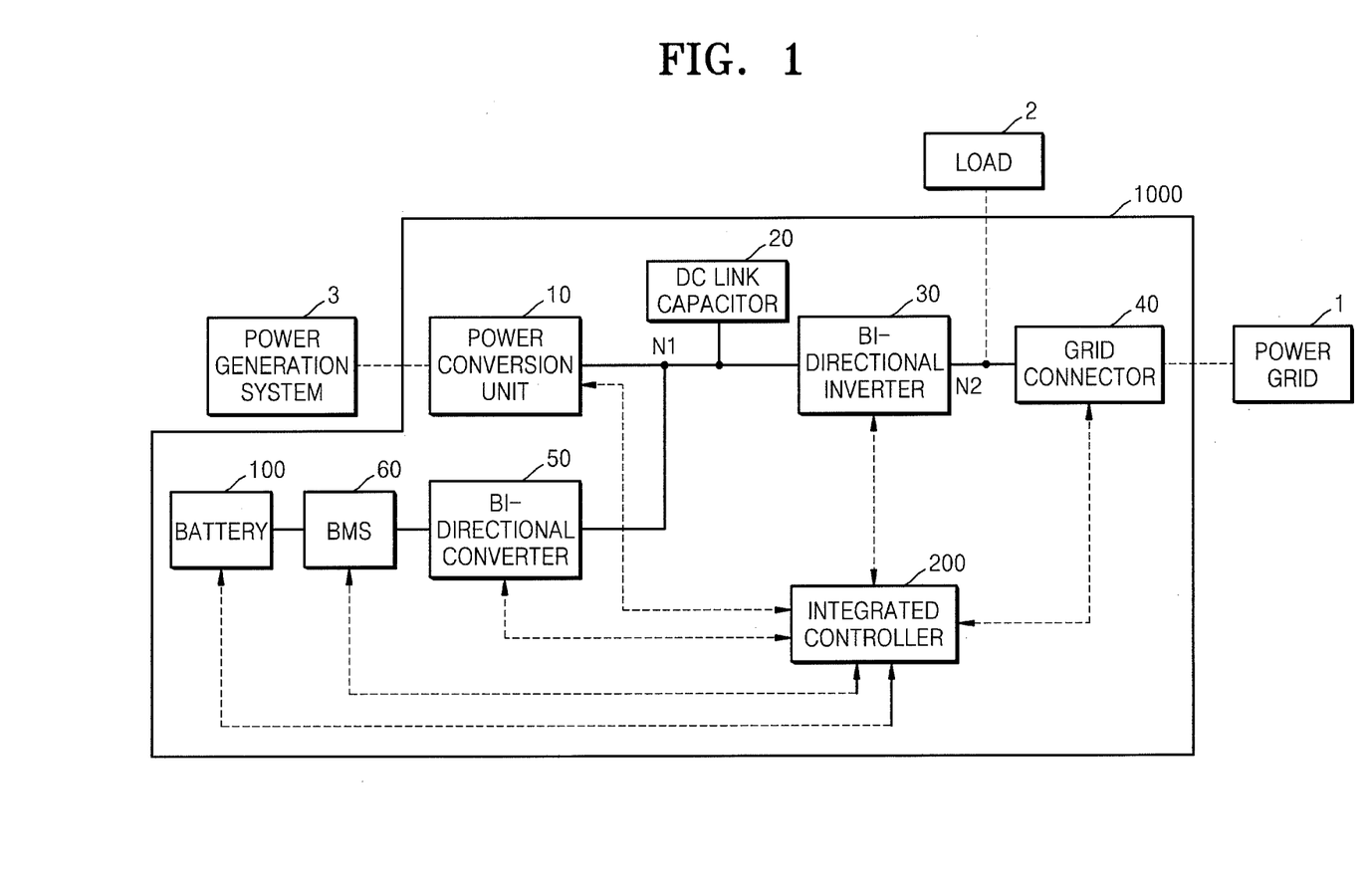
FIG. 1 is a block diagram of a power storage system according to an embodiment.

FIG. 1 is a block diagram of a power storage system according to an embodiment.

Referring to FIG. 1, the power storage system includes a power generation system 3 for generating electric power, a load 2 consuming the electric power, a power storage apparatus 1000, and a power grid 1 for transferring electric energy to or from the power storage apparatus 1000.

The power storage system of FIG. 1 may supply power generated by the power generation system 3 to the load 2 or the power grid 1 through the power storage apparatus 1000 or may store the generated power in the power storage apparatus 1000. The power storage apparatus 1000 may receive electric power from the power grid 1 and transfer the received electric power to the load 2 or may store the electric power received from the power grid 1. The power stored in the power storage apparatus 1000 can be supplied to the load 2 or to the power grid 1 and be sold.

The power storage apparatus 1000 may be enclosed within a cabinet or a box. If the power generation system 3 has a small size, the power storage apparatus 1000 and the power generation system 3 may be enclosed within a cabinet or a box.

The power grid 1 may include a power plant, a substation, and power transmission cables. In the present embodiment, the power grid 1 supplies power to the power storage apparatus 1000 and/or to the load 2, and receives power from the power storage apparatus 1000 in a normal state. When the power grid 1 is in an abnormal state, the power from the power grid 1 to the power storage apparatus 1000 and the load 2 is stopped, and power from the power storage apparatus 1000 to the power grid 1 is also stopped.

The load 2 receives power from the power storage apparatus 1000 or from the power grid 1. The load 2 may be, for example, a facility such as a house, a building, or a power plant that consumes the power.

The power generation system 3 supplies power to the power storage apparatus 1000. The power generation system 3 in some embodiments, uses renewable energy such as sunlight, water, terrestrial heat, river water, bio organism, etc. For example, the power generation system 3 may be a solar power generation system that converts solar energy such as solar heat and solar energy into electric energy. In addition, the power generation system 3 may be a wind power generation system that converts wind power into electric energy, a terrestrial heat power generation system that converts terrestrial heat into electric energy, a water power generation system, or an ocean power generation system. The power generation system 3 may generate electric energy using a fuel cell or may generate electric energy using hydrogen, liquefied coal gas or medium quality residual oil gas. The power generation system 3 may be another type of power generation system.

The power storage apparatus 1000 stores power supplied from the power generation system 3 or the power grid 1, and supplies the stored power to the power grid 1 or to the load 2. The power storage apparatus 1000 includes a power conversion unit 10, a DC link capacitor 20, a bi-directional inverter 30, a grid connector 40, a bi-directional converter 50, a battery management system (BMS) 60, a battery 100, and an integrated controller 200.

The power conversion unit 10 is connected between the power generation system 3 and a first node N1. The power conversion unit 10 converts the electric power generated by the power generation system 3 into a DC voltage for the first node N1. The operation of the power conversion unit 10 varies according to the electric power generated by the power generation system 3. For example, if the power generation system 3 generates an AC voltage, the power conversion unit 10 converts the AC voltage into the DC voltage of the first node N1. If the power generation system 3 generates the DC voltage, the power conversion unit 10 converts the DC voltage of the power generation system 3 to the DC voltage of the first node N1.

For example, if the power generation system 3 is a solar power generation system, the power conversion unit 10 may be a maximum power point tracking (MPPT) converter that detects an MPP and generates power according to a variation of amount of solar radiation by a solar light or a variation of temperatures by a solar heat. In addition, a variety of other types of converters or rectifiers may be used as the power conversion unit 10.

The bi-directional inverter 30 may be connected between the first node N1 and a second node N2 that is selectively connected to the load 2 or to the grid connector 40. The bi-directional inverter 30 performs DC-AC inversion and AC-DC conversion.

Figure 2:
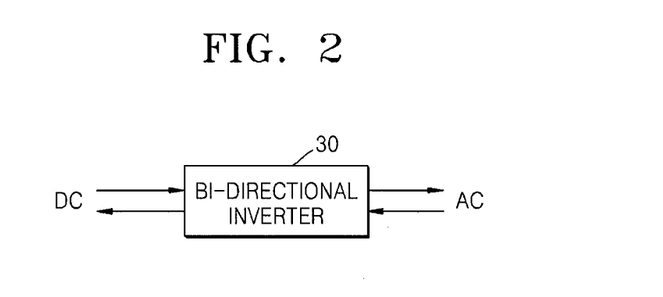
FIG. 2 is a diagram illustrating the inputs and outputs of a bi-directional inverter according to an embodiment.

FIG. 2 is a diagram for illustrating functionality of the bi-directional inverter 30 according to an embodiment.

Referring to FIG. 2, the bi-directional inverter 30 converts a DC voltage from the power generation system 3 through the power conversion unit 10 or a DC voltage output from the battery 100 through the bi-directional converter 50 into an AC voltage that is to be supplied to the load 2 or to the grid connector 40. The bi-directional inverter 30 also rectifies the AC voltage output from the grid connector 40 into a DC voltage that is to be stored in the battery 100. The bi-directional inverter 30 of the present embodiment may be a full bridge inverter and a filter for removing high frequency components. In addition, a variety of other types of bi-directional inverters may be used.

Referring again to FIG. 1, the bi-directional converter 50 is connected between the BMS 60 and the first node N1. The bi-directional converter 50 performs DC-DC conversion on the voltage of the first node N1 output from the power conversion unit 10 or the bi-directional inverter 30 into a voltage that is to be transferred to the battery 100 through BMS 60. The bi-directional converter 50 performs DC-DC conversion on power output from the battery 100 through the BMS 60 into the voltage of the first node N1.

Figure 3:
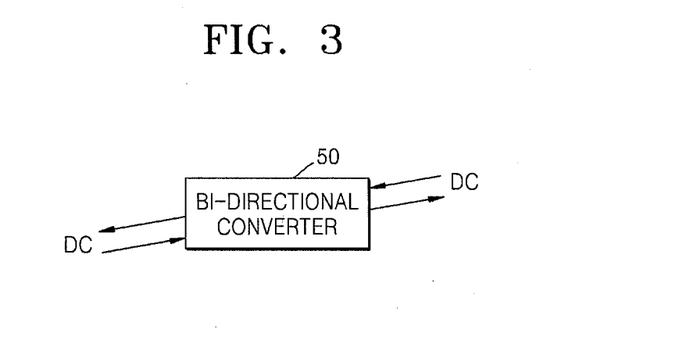
FIG. 3 is a diagram illustrating the inputs and outputs of a bi-directional converter according to an embodiment.

FIG. 3 is a diagram for explaining a function of the bi-directional converter 50 according to an embodiment.

Referring to FIG. 3, the bi-directional converter 50 converts a DC voltage that is output from the power grid 1 and is converted by the bi-directional inverter 30 or a DC voltage that is output from the power generation system 3 through the power conversion unit 10, to a DC voltage for the battery 100 and supplies the DC voltage to the battery 100. The bi-directional converter 50 increases or decreases a DC voltage output from the battery 100 through the BMS 60 to the DC voltage for the first node N1 and transfers the DC voltage to the first node N1. For example, if a voltage level of the first node N1 is 380 V, and a voltage level required by the BMS 60 is 100 V, the DC voltage of 380 V is decreased to the DC voltage of 100 V by the bi-directional converter 50 so that the battery 100 is charged with the correct voltage, and the DC voltage of 100 V is increased by the bi-directional converter 50 to the DC voltage of 380 V so that the increased voltage is supplied to the first node N1. The bi-directional converter 50 of the present embodiment may include a buck mode operation switch, a sync rectifying switch, an inductor functioning as a filter. In addition, a variety of other types of bi-directional converters may be used.

The DC link capacitor 20 is connected to the first node N1. The DC link capacitor 20 stabilizes a DC voltage level of the first node N1 as a DC link voltage level. For example, the voltage level of the first node N1 may be otherwise unstable due to a rapid change in the power generated by the power generation system 3 or an instantaneous voltage drop that occurs in the power grid 1. However, because of the DC link capacitor 20, the voltage of the first node N1 remains constant in order to perform stable operations of the bi-directional inverter 30 and the bi-directional converter 50. The DC link capacitor 20 may be realized by a super capacitor, and may use an energy storage apparatus such as a secondary battery. Other types of devices can also be used.

The grid connector 40 is connected between the power grid 1 and the bi-directional inverter 30. If an abnormality occurs in the power grid 1, the grid connector 40 disconnects the power storage apparatus 1000 from the power grid 1 under the control of the integrated controller 200. The grid connector 40 may be realized, for example, by a switching element, a bipolar junction transistor (BJT), a field effect transistor (FET), etc.

Although not shown, a switch may be additionally connected between the bi-directional inverter 30 and the load 2. The optional switch can block power from flowing into the load 2 and is under the control of the integrated controller 200. The switch may be realized by a BJT, a FET, etc.

The BMS 60 is connected between the battery 100 and the bi-directional converter 50. The BMS 60 maintains and manages the optimum status of the battery 100. For example, the BMS 60 may control charging and discharging the battery 100 reflecting a state of charge (SOC) and a state of health (SOH). The BMS 60 controls a temperature of the battery 100, thereby preventing the battery 100 from overheating due to a rapid increase in the temperature. In addition, the BMS 60 includes a circuit for protecting the battery 100 from over-voltage, over-current, and overheating.

The battery 100 is connected to the bi-directional converter 50 through the BMS 60. The battery 100 is charged with power supplied from the power generation system 3 or from the power grid 1. The battery 100 may supply stored power to the load 2 and to the power grid 1.

Figure 4:
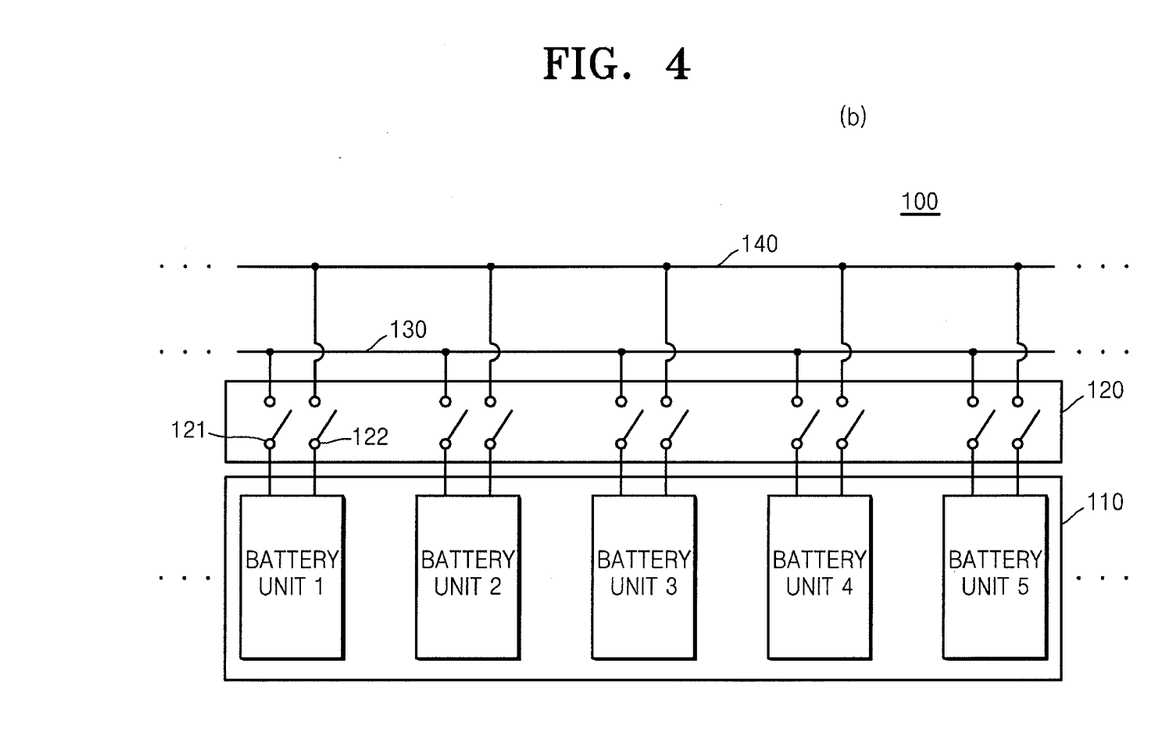
FIG. 4 is a block diagram illustrating a battery according to an embodiment.

As shown in FIG. 4, the battery 100 may include a plurality of battery units 110 that are connected in parallel to each other and are individually charged and discharged. The battery 100 may be a chargeable and dischargeable secondary battery and be a medium-large sized battery. The battery 100 may, for example, be a nickel-cadmium battery, a lead acid battery, a nickel metal hydride (NiMH) battery, a lithium ion battery, a lithium polymer battery, etc.

The battery 100 is charged with power supplied from the power generation system 3 or from the power grid 1 under the control of the integrated controller 200 in a normal grid state.

In an abnormal state of the power grid 1, the battery 100 of the present embodiment performs an uninterruptible power supply (UPS) function and transfers the charged power to the load 2 under the control of the integrated controller 200 and simultaneously stores power generated by the power generation system 3. In the present embodiment, the plurality of battery units 110 may be individually charged and discharged under the control of the integrated controller 200 in an abnormal grid state. In more detail, some of the battery units 110 may be discharged by supplying the power to the load 2, whereas the other battery units 110 may store power generated by the power generation system 3. Therefore, even though the abnormal grid state continues, the battery 10 can continuously supply a sufficient amount of power to the load 2.

FIG. 4 is a block diagram illustrating the battery 100 according to an embodiment.

Referring to FIG. 4, the battery 100 includes the plurality of battery units 110 that are connected in parallel to each other and are individually charged and discharged. Each battery unit 110 includes a charging switching element 121 connected to a charging path 130 and a discharging switching element 122 connected to a discharging path 140.

The battery units 110 are connected to the charging path 130 and store power generated by the power generation system 3 and the power supplied from the power grid 1 under the control of the integrated controller 200 in a normal grid state. When the battery units 110 are disconnected from the power grid 1 in an abnormal state, some of the battery units 110 are connected to the charging path 130 and are charged with power supplied from the power generation system 3 under the control of the integrated controller 200. The other battery units 110 are connected to the discharging path 140 and supply the power to the load 2.

The switching elements 120, 121, and 122 may be realized as a switch, a BJT, a FET, etc. However, the present invention is not limited thereto and other electric elements for performing a switching function may be used as the switching elements 120, 121, and 122. The switching element 120 selectively connects each of the battery units 110 to the charging path 130 or the discharging path 140 under the control of the integrated controller 200.

The integrated controller 200 controls the various components as discussed above. The integrated controller 200 of the present embodiment detects a normal state or an abnormal state of the grid 1, and controls the grid connector 40 in order to disconnect the power grid 1 and the power storage apparatus 1000 in the abnormal grid state. The integrated controller 200 controls the battery 100, the BMS 60, the power conversion unit 10, the bi-directional converter 50, etc. so as to store the power generated by the power generation system 3 in the battery 100 even in the abnormal grid state. The integrated controller 200 controls the battery 100, the BMS 60, the bi-directional converter 50, the bi-directional inverter 30, etc. so as to supply the power stored in the battery 100 to the load 2 in the abnormal grid state such that the system perform a UPS function. The operation of the integrated controller 200 for controlling charging and discharging of the battery 100 in the abnormal grid state is further described with reference to the following drawings.

Figure 5:
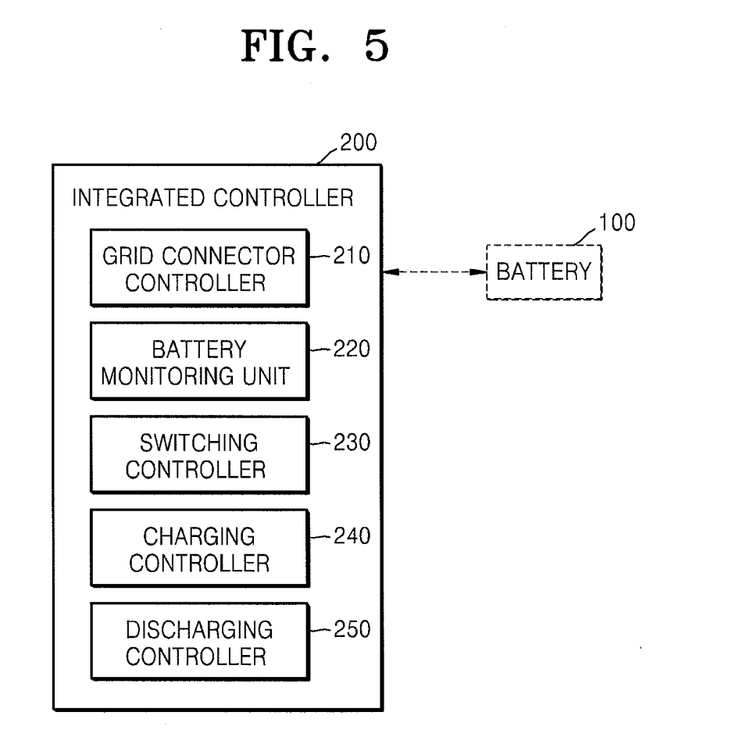
FIG. 5 is a block diagram of an integrated controller according to an embodiment.

FIG. 5 is a block diagram of the integrated controller 200 according to an embodiment.

Referring to FIG. 5, the integrated controller 200 includes a grid connector controller 210 that detects an abnormal state of the grid 1 and disconnects the power grid 1, a battery monitoring unit 220 and a switching controller 230 that connects each of the battery units 110 to the charging path 130 or the discharging path 140 according to charging and discharging status of the battery units 110, a charging controller 240 that controls each element related to the charging path 130 when the battery units 110 are connected to the charging path 130, and a discharging controller 250 that controls each element related to the discharging path 140 when the battery units 110 are connected to the discharging path 140.

The grid connector controller 210 detects an abnormal state of the power grid 1, controls the grid connector 40, and disconnects the power grid 1 and the power storage apparatus 1000. For example, the abnormal state may mean that the power grid 1 is in an abnormal state due to an electric failure, short-circuit, or a ground fault, etc. The power connector controller 210 detects a voltage, current, a temperature, an AC phase, etc. of the power grid 1, detects whether the power grid 1 is in the abnormal state or in the normal state. If the power grid 1 is in the abnormal state, and turns the power grid 1 off.

The battery monitoring unit 220 monitors charging and discharging states of the battery units 110 in the abnormal grid state, and determines whether to connect the battery units 110 to the charging path 130 or the discharging path 140. However, the present invention is not limited thereto and the battery monitoring unit 220 may, for example, further monitor remaining power capacity, a voltage, current, etc. through the BMS 60.

The battery monitoring unit 220 monitors the charging and discharging states of each of the battery units 110. The battery monitoring unit 220 determines to connect the battery units 110 that are an incomplete charging state in the abnormal grid state to the charging path 130. The battery monitoring unit 220 determines to connect the battery units 110 that are a complete charging state to the discharging path 140. In this regard, the complete charging state may mean a state where the remaining power capacity of the battery units 110 exceeds a reference level. The incomplete charging state may mean a state where the remaining power capacity of the battery units 110 is less than the reference level or less than another reference level. However, the present invention is not limited thereto and the complete charging state may mean a full charging state of the battery units 110 or a state where the battery units 110 can stably supply power to the load 2 for a period of time. The incomplete charging state may mean a state where the battery units 110 reach a minimum charging value or a state where the battery units 110 can not stably supply power to the load 2 for a period of time.

The switching controller 230 controls the switching element 120 connected to each of the battery units 110 to the charging path 130 or the discharging path 140 according to the determination of the battery monitoring unit 220.

The charging controller 240 controls all the elements of the charging path 130 that store power generated by the power generation system 3 in the battery 100. The charging controller 240 controls the power conversion unit 10 to convert the power generated by the power generation system 3 to a DC voltage of the first node N1. The charging controller 240 additionally controls the bi-directional converter 50 to perform DC-DC conversion on the DC voltage of the first node N1 into a voltage required by the BMS 60. The charging controller 240 also controls the BMS 60 to manage charging according to a temperature, current, a voltage, etc.

The discharging controller 250 controls the elements of the discharging path 140 that supplies power stored in the battery 100 to the load 2. The discharging controller 250 controls the BMS 60 to manage discharging according to a temperature, current, a voltage, etc. of the battery 100. The discharging controller 250 additionally controls the bi-directional converter 50 to convert a DC voltage that is output from the battery 100 into the DC voltage for the first node N1. The discharging controller 250 controls the bi-directional inverter 30 to invert the DC voltage of the first node N1 into an AC voltage and to supply the AC voltage to the load 2.

The operation of the integrated controller 200 is described with reference to FIGS. 6 and 7.

Figure 6:
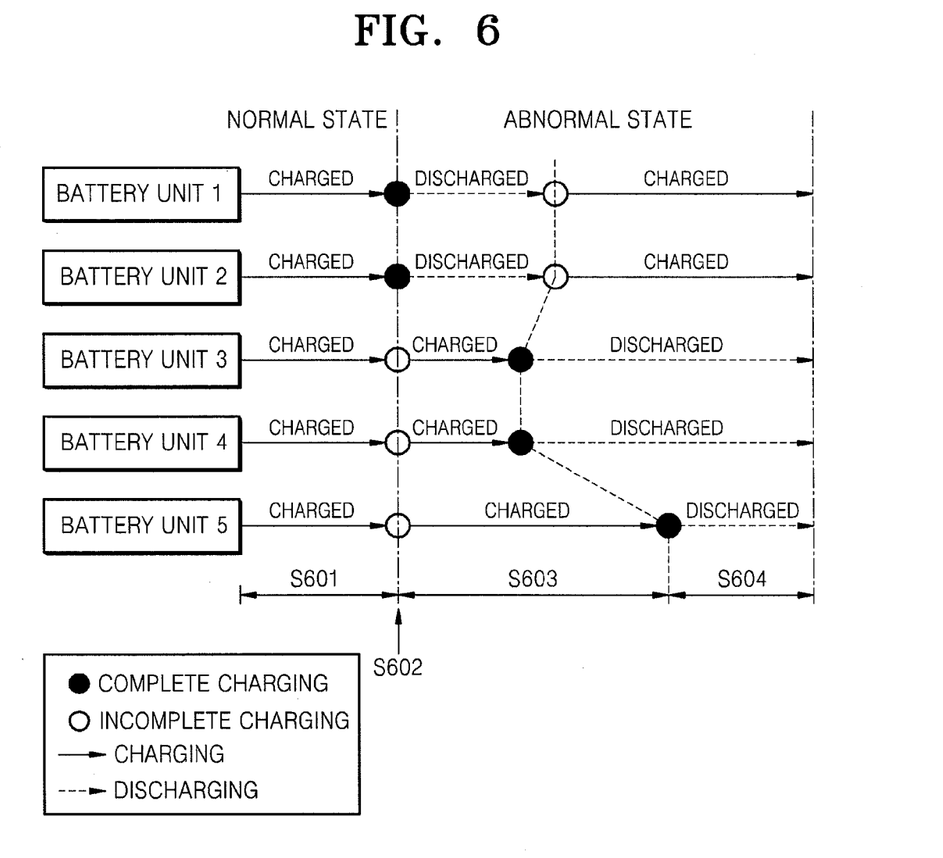
FIG. 6 is a state diagram illustrating the operation of a power storage apparatus according to an embodiment.

FIG. 6 is a state diagram illustrating the operation of the power storage apparatus 200 according to an embodiment.

Referring to FIG. 6, the battery 100 of this embodiment includes five battery units 110. However, the number and structure of the battery units 110 are not limited thereto.

The battery 100 is charged with the power from the power generation system 3 or from the power grid 1 in a normal grid state (S601). Some of the battery units 110 may be in a complete charging state. The other battery units 110 may be in an incomplete charging state. The complete charging state or the incomplete charging state may depend on a type and capacity of the battery 100, and a type of load 2, or may be determined according to charging and discharging states of each of the battery units 110.

When an abnormal state occurs in the power grid 1 (S602), the integrated controller 200 disconnects the power grid 1 from the power storage apparatus 1000 with grid connector 40. The integrated controller 200 controls the system to supply power stored in the battery 100 to the load 2 or to supply power generated by the power generation system 3 to the load 2, so that the power storage apparatus 1000 can serve as a UPS.

If the abnormal grid state starts, the integrated controller 200 monitors states of the battery units 110 and the power generation system 3. For example, suppose that battery units 1 and 2 are in a complete charging state, and battery units 3 through 5 are in an incomplete charging state. The integrated controller 200 controls the battery 100 to supply power to the load 2 by connecting the battery units 1 and 2 to the discharging path 140, and to charge the battery units 110 with the power from the power generation system 3 by connecting the battery units 3 through 5 to the charging path 130 (S603).

While the abnormal grid state continues, the integrated controller 200 periodically monitors the battery 100 and the power generation system 3. If the battery unit 1 or the battery unit 2 is in the incomplete charging state, the integrated controller 200 controls the battery 100 to charge the battery units 110 with power from the power generation system 3 by connecting the battery unit 1 or the battery unit 2 to the charging path 130. If at least one of the battery units 3 through 5 is in the completely charged state, the integrated controller 200 controls the battery 100 to supply the power to the load 2 by connecting the completely charged battery units to the discharging path 140 (S604).

The process shown in FIG. 6 is merely an example and the present invention is not limited thereto and various processes may be performed. For example, an abnormal grid state may occur when all five battery units are in the completely charged state. The battery monitoring unit 220 may monitor the charging state of the battery units, and the switching controller may connect the five battery units to the discharging path 140.

Figure 7:
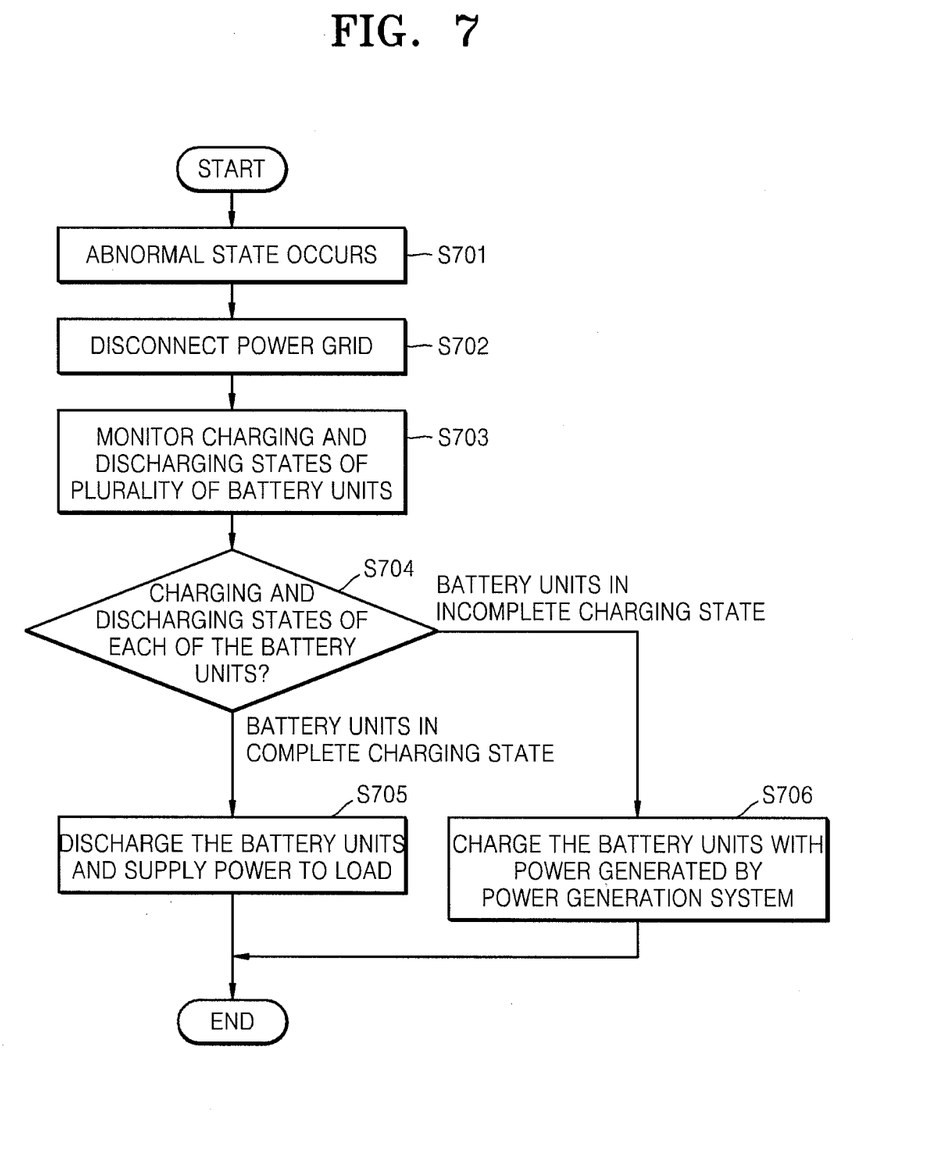
FIG. 7 is a flowchart illustrating a method of operating a power storage apparatus, according to an embodiment.

FIG. 7 is a flowchart illustrating a method of operating the power storage apparatus 1000, according to an embodiment.

Referring to FIG. 7, when an abnormal state occurs in the power grid 1 (S701) due to, for example, repair and management of distribution lines, a short-circuit accident, a ground fault accident, or an electric failure, the power storage apparatus 1000 detects the abnormal sate and disconnects the load 2 and the bi-directional inverter 30 from the power grid 1 (S702).

The integrated controller 200 of the power storage apparatus 1000 monitors charging and discharging states of each of the battery units 110 (S703).

The integrated controller 200 of the power storage apparatus 1000 determines whether the battery units 110 are in a complete charging state or are in an incomplete charging state (S704), and connects the battery units 110 that are in the complete charging state to the discharging path 140 to supply power to the load 2 (S705). The integrated controller 200 of the power storage apparatus 1000 also connects the battery units 110 that are in the incomplete charging state to the charging path 130 to charge the battery units 110 with power supplied from the power generation system 3 (S706).

If the abnormal grid state continues, the integrated controller 200 of the power storage apparatus 1000 may monitor charging and discharging states of the battery units in real time and individually control the monitored charging and discharging states of the battery units as described with reference to FIG. 6.

According to the described embodiments, the power storage apparatus and the method of operating the power storage apparatus can stably and continuously supply power when a power grid is in an abnormal state.

It should be understood that the exemplary embodiments described herein should be considered in a descriptive sense only and not for purposes of limitation. Descriptions of features or aspects within each embodiment should typically be considered as available for use in other embodiments.

What is claimed is:

1. A power storage apparatus, comprising:
    a power conversion unit connected between a power generation system and a first node, wherein the power conversion unit is configured to convert power generated by the power generation system into a DC voltage for the first node;
    a battery management system (BMS);
    a bi-directional converter connected between the BMS and the first node, wherein the bi-directional converter is configured to convert the DC voltage of the first node to a DC voltage for the BMS and to convert the DC voltage of the BMS to the DC voltage of the first node;
    a bi-directional inverter connected between the first node and a second node, wherein the bi-directional inverter is configured to invert the DC voltage of the first node into an AC voltage for a load or for a power grid and to convert an AC voltage from the power grid into the DC voltage of the first node;
    a grid connector for connecting the power grid to the second node;
    a battery comprising a plurality of battery units configured to be charged by power from at least one of the power generation system and the grid, and to be discharged to supply power to the load; and
    an integrated controller configured to determine a state of the grid, and if the grid is in an abnormal state to control the grid connector to disconnect the power grid from the second node, and the integrated controller is configured to control the power conversion unit, the bi-directional converter, the bi-directional inverter, the grid connector, and the battery, wherein if the grid is in an abnormal state the integrated controller monitors a charging and discharging status of the battery and controls the battery to supply power to the load and to be simultaneously charged with power generated by the power generation system.

2. The power storage apparatus of claim 1, wherein the battery comprises:
    a plurality of battery units connected in parallel with each other, wherein the battery units are configured to be individually charged and discharged; and
    a plurality of switching elements, each switching element configured to connect one of the plurality of battery units to a charging path or to a discharging path.

3. The power storage apparatus of claim 2, wherein, if in the abnormal grid state, the battery units which are connected to the charging path, are charged with power supplied from the power generation system, and the battery units which are connected to the discharging path are discharged by supplying power to the load.

4. The power storage apparatus of claim 2, wherein the integrated controller comprises:
    a power grid controller configured to detect the abnormal state, to control the grid connector, and to disconnect the power grid from the second node;
    a battery monitoring unit configured to monitor the charging and discharging status of the plurality of battery units and to determine whether to connect each of the plurality of battery units to the charging path or to the discharging path according to the charging and discharging status of each battery unit; and
    a switching controller configured to control the switching element of each battery unit according to the determination of the battery monitoring unit.

5. The power storage apparatus of claim 4, wherein the battery monitoring unit is configured to determine that the battery units in a completely charged state are to be connected to the discharging path and that the battery units in an incomplete charging state are to be connected to the charging path.

6. The power storage apparatus of claim 4, wherein the integrated controller further comprises:
    a charging controller configured to control the power conversion unit and the bi-directional converter so as to charge the plurality of battery units with power generated by the power generation system; and
    a discharging controller configured to control the bi-directional converter and the bi-directional inverter so as to supply power stored in the plurality of battery units to the load.

7. The power storage apparatus of claim 1, wherein the power generation system comprises a new or renewable energy source.

8. The power storage apparatus of claim 1, wherein the power generation system comprises at least one of: a solar power generation system, a wind power generation system, a ground heat power generation system, a water power generation system, an ocean power generation system, and power generation system that uses a fuel battery, hydrogen, liquefied coal gas or medium quality residual oil gas.

9. The power storage apparatus of claim 1, further comprising a DC link capacitor connected to the first node.

10. The power storage apparatus of claim 1, wherein the BMS is connected between the battery and the bi-directional converter and is configured to manage the battery.

11. A method of operating a power storage apparatus connected to a power generation system, a power grid, and to a load, the apparatus comprising a power conversion unit, a bi-directional converter, a bi-directional inverter, a grid connector, a battery comprising a plurality of battery units, and an integrated controller for controlling the power conversion unit, the bi-directional converter, the bi-directional inverter, the grid connector, and the battery, the method comprising:
    disconnecting the power grid from the power storage apparatus as a result of the grid being in an abnormal state;

monitoring the charging and discharging status of each of the plurality of battery units; and according to the charging and discharging status of each of the plurality of battery units discharging certain battery units to supply power to the load, and simultaneously charging other battery units with power generated by the power generation system.

12. The method of claim 11, further comprising:

connecting battery units that are in a complete charging state to a discharging path; and connecting battery units that are in an incomplete charging state to a charging path.

13. The method of claim 12, wherein connecting battery units to the discharging path supplies power from the battery units connected to the discharging path to the load.

14. The method of claim 12, wherein connecting battery units to the charging path charges the battery units connected to the charging path with power generated by the power generation system.

* * * * *